(12) United States Patent
Applegate et al.

(10) Patent No.: US 8,504,211 B2
(45) Date of Patent: Aug. 6, 2013

(54) INPUT DISPENSER AND RECORDER

(76) Inventors: Doug Applegate, Oakland, IA (US);
Luke Applegate, Oakland, IA (US);
Brent Applegate, Oakland, IA (US)

( * ) Notice: Subject to any disclaimer, the term of this patent is extended or adjusted under 35 U.S.C. 154(b) by 1526 days.

(21) Appl. No.: 11/519,123

(22) Filed: Sep. 12, 2006

(65) Prior Publication Data
US 2007/0083293 A1 Apr. 12, 2007

Related U.S. Application Data

(60) Provisional application No. 60/717,135, filed on Sep. 14, 2005.

(51) Int. Cl.
*G05D 11/02* (2006.01)
(52) U.S. Cl.
USPC ............ 700/285; 700/283; 701/50; 180/14.5; 224/519; 296/168
(58) Field of Classification Search
USPC ......... 700/283, 285; 701/50; 180/14.1–14.5; 224/519; 296/168, 184.1
See application file for complete search history.

(56) References Cited

U.S. PATENT DOCUMENTS

| | | | |
|---|---|---|---|
| 3,563,475 A * | 2/1971 | Emery et al. | 239/654 |
| 5,630,665 A * | 5/1997 | VanBruggen | 366/186 |
| 5,853,244 A * | 12/1998 | Hoff et al. | 366/141 |
| 6,122,581 A | 9/2000 | McQuinn | |
| 6,457,427 B1 | 10/2002 | Moszorn et al. | |
| 6,606,542 B2 | 8/2003 | Hauwiller et al. | |
| 6,708,631 B1 | 3/2004 | McQuinn et al. | |
| 6,732,667 B1 | 5/2004 | Wilson | |
| 6,863,006 B2 | 3/2005 | Sandoval et al. | |
| 6,938,829 B2 | 9/2005 | Doherty et al. | |
| 7,275,042 B1 * | 9/2007 | Kelly et al. | 705/26.25 |
| 2002/0035826 A1 * | 3/2002 | Albinger et al. | 56/109 |
| 2003/0018423 A1 | 1/2003 | Saller et al. | |
| 2004/0079282 A1 * | 4/2004 | Sano et al. | 118/200 |
| 2005/0235891 A1 * | 10/2005 | Garner | 111/200 |

* cited by examiner

*Primary Examiner* — Mohammad Ali
*Assistant Examiner* — Sheela S Rao
(74) *Attorney, Agent, or Firm* — Camille L. Urban

(57) ABSTRACT

An input dispenser/recorder controlled by a computer to dispense a predetermined amount of input or mixture of inputs based on parameters provided by an operator. Specifically, the invention has an inner frame and outer frame associated by load bars connected to the computer. The load bars signal the computer regarding weight change on the inner frame. Associated with the inner frame is at least one major input container having an opening over a conveyor and a valve therebetween controlled by the computer. Associated with the outer frame are minor input containers, each in fluid communication with the conveyor and a flow meter controlled by the computer. The conveyor may be a flighted auger, a belt, or pump and conduit and is also controlled by the computer. The parameters provided by the operator are used by a selected program and the CPU to control the amount and ratio of inputs, speed of conveyor, and mixture thereof.

44 Claims, 14 Drawing Sheets

INPUT DISPENSER AND RECORDER

BACKGROUND OF THE INVENTION

1. Field of the Invention

Invention relating to devices used to assist agricultural operators to accurately mix and dispense inputs and record relevant data Specifically, the invention relates to feed mixers, seed tenders, and herbicide, pesticide, and fertilizer mixers as well as farm management activities and software for analyzing and tracking related data.

2. Description of the Prior Art

As technology has advanced, the agricultural community has taken advantage of the opportunities afforded by those advances. Computer programming is now as important to many agriculturally oriented operations as the physical machinery. For example, livestock operations include tracking of feed intake per animal versus weight gain and records all medication or other inputs as well. Grain producers use global positioning interfaced with customized databases to record herbicide, pesticide, and fertilizer applications along with variety and seed treatment data.

As in most businesses, higher efficiencies and precision accuracy will increase the success of agricultural operations. Specifically, many operators wish to reduce the time required to re-load a planter. Many planters now use a single seed bin rather than a separate bin for each row on the planter. Operators often use GPS to record start and stop areas when planting a certain variety. Some operators use a blower to blow seed from a transport container to a planter thereby reducing time to load planter. Many also pretreat the seeds before bringing them to the field.

After seed is in the ground, many different conditions may occur. Any one of these conditions may indicate the need to apply fertilizer or herbicides. Operators often use a recipe including multiple chemicals and a diluent all of which must be accurately metered, mixed, and recorded before dispensing. In addition, an operator may alter that recipe according to certain conditions such as weather, precipitation, time of day, etc. However, these alterations are typically determined at the time the operator is nixing the batch and are determined by the operator. Previous batch mixers did not include fully automated adding and mixing or allow for dictating a combination of manual and autoloading while recording and taking into account all relevant data. Further, the operator-determined and created batch included many opportunities for error including leaving out a component or adding incorrect amounts of a component or failure to take into account all of the factors in play prior to creating he present batch.

Operators of livestock setups are also faced with record keeping challenges relative to inputs. Reduction in time required to measure and mix additives to feed and a method to record the amounts, ratios and identity of recipient livestock is crucial to the stewardship of herds. However, feed mixers are not often equipped to track herd identifiers relative to source of input or to automatically apply a particular ratio in a mix according to the herd identifier and predetermined criteria associated with that herd. Further, the inventory of feed source and additive sources were difficult to manage.

What was needed was a basic and transportable structural and programming framework that can mix, measure and record inputs for batch production in grain crop planting and growth applications as well as livestock feeding in order to save time and increase the accuracy of data recordation. Further, this framework needed to include capabilities for application of predetermined criteria to tailor a predetermined ratio of inputs according to real time or near real time conditions as well as relative to the conditions of the receiving organisms. Finally, the framework would need to be equipped to store and/or transmit all data to other systems in order to assist in full farm management activities.

The first objective of the present invention is to improve the accuracy of recording inputs relative to geography;

A second objective of the present invention is to improve the accuracy of proportionate batch mixing through computer-aided measurement;

A third objective is to improve time efficiencies of mixing and loading inputs from transporter to applicator, A fourth objective is to record relevant data pertaining to mixing and amounts of inputs relative to inventory management for download or real-time communication with pre-existing farm management data collection tools including historical analysis, work order creation, and planning;

A fifth objective is to allow automated adjustments of predetermined input ratios according to specified criteria such as weather, herd condition, time of day, weed growth, wind speed, etc., and to record all such criteria along with the batch ratio actually mixed along with time, date, herd identifier, and geographic coordinates;

A sixth objective is to reduce or eliminate human error in determining the appropriate ratios of inputs, creating the appropriate mixtures, and recording all relevant data.

SUMMARY OF THE INVENTION

Today's agricultural operator spends as much time planning and managing in his office as physically working in the field or feedlots. Many operators have a number of employees carrying out a variety of duties, each employee having a different skill level. In addition, the climate of agricultural production calls for higher precision in application of inputs and tracking of source and destination of each input. Careful analyses of past successes and failures in conjunction with application of the newest theories are the requisites for well-managed operations and require databases with appropriate data. The foregoing can only be accomplished through computer-assisted machinery designed to remove human error and to record all necessary data points.

In its most basic form, the present invention is an input dispenser/recorder comprising an inner frame and an outer frame mounted on wheels or tracks and including a hitching means for transport purposes. In the preferred embodiment, it is transported to a field or feeding area where it remains stationary while it mixes inputs and then dispenses the mixture to an applicator. The applicator then transports and applies the mixture simultaneously.

The preferred embodiment includes load bars placed between the inner frame and the outer frame and comprises at least one electronic scale. Means to convey inputs, and a CPU with touch pad or key pad inputs are included in the dispenser/recorder. Programming to record desired inputs, calculate amounts of desired inputs, track inventory remaining, and related information and to control means to effect the addition and/or mixing of inputs based on operator criteria and parameters is incorporated. The preferred embodiments include wireless communication with the applicator's on-board system and/or office system in real time or through downloading wherein the data includes GPS coordinates and time stamps. Local instrumentation to detect weather conditions may also be employed in the preferred embodiment wherein these conditions may be used as criteria in the programming algorithm to determine necessary ratios of inputs. Weather conditions may, instead, be provided to the CPU via download from another system or by manual input from the operator.

The input dispenser/recorder may be configured to dispense dry, wet, or a combination of dry and wet inputs. Specifically, major input containers are usually associated with the inner frame. Each major input container has an opening through which its contents are dispensed. The opening is positioned over an orifice equipped with a shut-off mechanism in fluid communication with the conveyor. Via the load bars, the inner frame is associated with the at least one electronic scale electrically connected to the CPU. The scale informs the computer of weight change in the major inputs containers during dispensing of inputs. It is contemplated that each major input container may also be associated with a singular electronic scale to separately track weight changes.

Minor inputs in minor containers are associated with the outer frame. Each has an opening through which material flow is metered and which is in fluid communication with the means to convey inputs. Ratios of a plurality of inputs in a resulting mixture may be controlled by a combination of monitoring weight change, speed at which said means to convey are operated, and the control of flow meters all in communication with the CPU and program. In one embodiment, the outer frame may include hollow portions that act as a reservoir for hydraulic fluid.

The CPU includes progranmnig such that an operator may provide specific parameters and the computer will determine the weight (or volume) of each input required, and the amount and flow of the input necessary to achieve the desired mixture. The programming will electronically control the opening and closing of shut-off valves and flow meters such that the correct amounts and mixtures are attained during dispensing and conveying.

A further feature of the input dispenser/recorder provides for pre-programmed dispensing. Although the conveyors may run continuously, the program facilitates dispensing mixture only in amounts dictated by the capacity of the receiving container or containers. Where multiple receiving containers will be used, preprogrammed time delays can drastically increase the efficiency of dispensing the mixture into the containers.

In the preferred embodiment for liquid, inputs (major or minor) are singly dispensed. Means to convey include a pump and conduit A valve to a recipient container is controlled by the CPU and the recipient container is associated with an electronic scale. The recipient container empties the single input into a mixing container, an automatic rinse of the recipient container occurs and then the next liquid is weighed into the recipient container. For very small liquid amounts, the CPU may prompt the operator to add it to the mixing tank in the correct order and amount. The operator then indicates that the input was added and the program resumes its automated activities. In the case of addition of a major input in the form of a diluent, the major input container may be gravitationally positioned and equipped with an opening controlled by the CPU such that the diluent can be added without pump or valve to the recipient tank where its weight is monitored and the CPU closes the opening when the appropriate weight is reached. In yet another modification, rather than the CPU controlling a pump and valve associated with each input, the CPU may prompt the operator to add each particular input one at a time. As the required weight of the particular input is neared (as monitored in the recipient tank by the CPU) the CPU will alert the operator to stop the flow, the CPU then measures and records the exact weight addedI The CPU then prompts the addition of each input in the same manner thereby assisting the operator to mix the liquids in proper order and proper amount of each input. The mixing container preferably includes an agitator which is controlled by the CPU in conjunction with preprogrammed time delays in the program.

Means to convey may include belt conveyors, flighted augers, or some combination thereof run by motors and hydraulics. In the liquid version, conduits, valves, and pumps will replace the belt or flighted augers as necessary. In addition, an air delivery system may be employed whereby an air source and pressure source work within a conduit system to transport a mixture of mostly dry inputs. Each possibility has advantages; the belt system is easier to clean out and is usually faster. However, a flighted auger system will provide better mixing for more even applications. Pumping mechanisms can offer even further mixing assurances. The air delivery system offers the advantages of speed and increased accuracy, however, it is more complex with the inclusion of air locks. Positioning of the final auger or conduit relative to the CPU provides easy access and control; it folds into the outer frame for transport ease. This also increases operational safety and makes operation more readily achievable even for an operator with disabilities.

The data parameters provided by the operator and the program's relative outputs are all recorded with time and date stamps. In one embodiment, the operator may input field identifiers along with mix parameters and characteristics of the input such as seed size. In another embodiment, GPS location coordinates are incorporated for more accurate records of location. As mentioned above, current weather and growing conditions may be input either electronically or by the operator and the program written to include algorithms wherein these conditions are taken into account in the mixture to be created. The data can then be cross-loaded either in real-time or as periodic downloads accomplished either by wireless or physical means, to other production management software for seamless viewing and analysis of inputs by location, yield, outcomes and other variables in addition to providing access to present inventories available and totals of products (inputs) used to date or within a given time frame. Inventories in storage can therefore be managed and the location at which each input is applied can be positively identified for tracking purposes relative to GMO's, growing first generation hybrid seed, chemical applications, etc. The production management software can also download to the dispenser or a transportable medium work orders for a specific job or a recipe for a mixture.

The wireless version allows the operator to actuate the input dispenser/recorder and input parameters remotely. This may mean the operator stays on the tractor pulling a planter or the sprayer or the feed wagon rather than dismounting to reload This approach results in safer mixing of chemicals and in higher efficiencies in application.

In one embodiment for use with planters, the input dispenser/recorder functions as an automated seed tender. Seed containers function as major output containers wherein dispensing of seed is largely controlled by a butterfly valve in the orifice and in communication with the CPU. Seed treatment containers function as minor input containers and are preferably mounted on the outer frame. Treatment flow is controlled by flow meters or metering pumps rather than weight change. The seed containers are secured to the inner frame and associated with at least one electronic scale through load bars. As the seed enters the conveying means it is transported past an orifice through which at least one seed treatment is applied and the seeds and treatment are mixed as the seed is moved. In a preferred embodiment, a set tank is provided in which treated seeds may be temporarily held. The set tank is associated with means to vibrate liquid treated seeds which allows the liquid to "set" on the seeds and prevents bridging when the seeds are finally conveyed to the planter. The mixing, dispensing and set can be completely automated such that these actions occur while the operator is planting and is finished when the planter requires more seeds.

In addition to calculating and dispensing the required amount of seed and treatments for the desired number of acres, the system keeps a running record of inputs remaining on the dispenser/recorder based on weight and will display the number of acres that may be planted with the remaining amounts of inputs. The seed containers are secured to the inner frame by a tension-secured rail that is hand-operable to swing into place once the containers are set in place on the inner frame. This tension rail can be adjusted in position so that it can be applied with other containers, as well.

The automated seed tender preferred embodiment is equipped with means for cleaning the conveyors. Specifically, conveying means comprises a plurality of flighted augers each positioned inside a tubular housing. At end of dispensing, each flighted auger is lowered to near contact with the tubular housing. This action is triggered by a change in torque on the drive motor and a mechanism that is dependant on torque. Lowering the auger cleans out the tubular housing.

An additional modification includes a small seed bin mounted on the outer frame. Should an operator have a small amount and known weight of seed, he can load the bin from the bed of a pickup truck. The seed bin is in fluid communication with said means to convey and seed treatments. Flow of seed from the seed bin is governed by the CPU through a valving mechanism.

In another embodiment, at least one liquid major input container is secured to the inner frame. Typically, this holds the diluent which is often water. Minor input containers are associated with the outer frame or the inner frame. In the preferred version of the liquid embodiment, the flow of the major input container is controlled by a valve and pump or via gravity and an opening controlled by the CPU; flow of the minor input container contents is typically controlled by the CPU using a pump and valve. Each minor input container is in fluid communication with a conduit system which is connected to a recipient container. The recipient container is associated with an electronic scale and fluidly connected to a mixing tank through a stop valve. Each input is weighed as it enters the recipient tank and emptied into the mixing tank before the next input is weighed. The major input container may include a flow meter to measure the required amount of diluent to be transferred to the mixing tank or it may simply be gravitationally positioned such that the CPU opens the opening until the appropriate weight is in the recipient tank and then closes the opening. The preferred embodiment includes an agitator in the mixing tank. Once again, via manual or electronic input of parameters, the CPU controls the valves and pumps to effect flow of each input to the recipient tank, detect appropriate weight, and transfer it to the mixing tank and to meter the appropriate amount of diluent. Further, a time sequence for mixing can be effected by the CPU via the program As alternatively described above, the addition of certain inputs may be prompted, weighed and recorded by the CPU and program although physically effected by the operator.

Finally, it is important to maintain a record of weather conditions present during the application of certain herbicides, pesticides, fungicides. Some operators also keep track of weather conditions when planting. The dispenser/recorder's preferred embodiment includes automatic recordation of weather conditions pertaining at the time a batch of the mixture is dispensed to the applicator. Such conditions can be obtained from local information, or on-line services, or may be detected by a dispenser equipped with appropriate instrumentation. At its simplest, the dispenser will not dispense until an operator inputs general conditions such as temperature, wind direction and speed, cloud cover, precipitation This information is may be used by the program to calculate new ratios and/or communicated to the applicator's on-board system or to an office system along with the other data recorded per batch.

DETAILED DESCRIPTION OF THE PREFERRED EMBODIMENT

The present invention is an input dispenser and recorder 10 used to automate mixing predetermined ratios of desired inputs, dispense the mixture, and record such information as the time, date, amounts of each input used and the receiver of the inputs either by area and location or by herd identification. The recordation of the data facilitates inventory management, planning, and analysis when cross-loaded to other programs resident in systems on-board applicators or in office systems.

Figure 1:
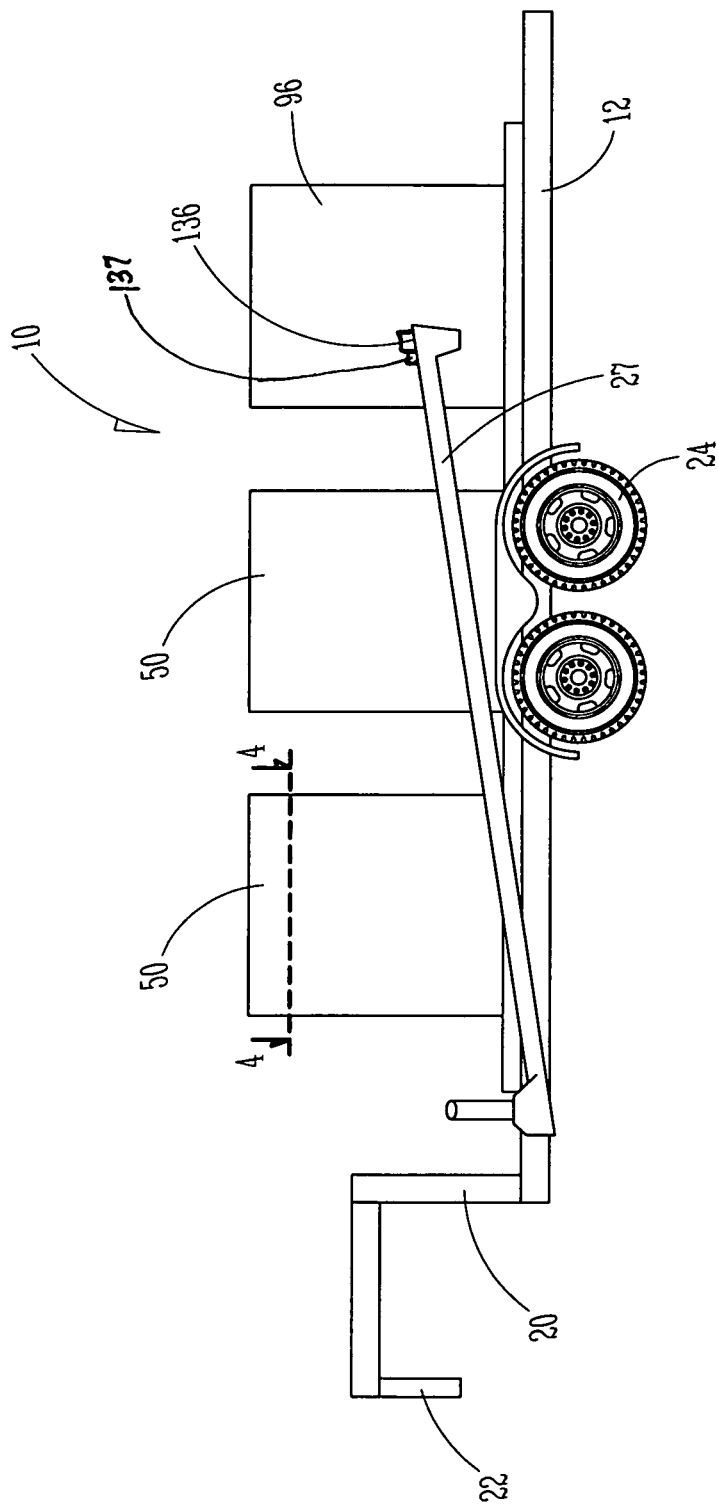
FIG. 1 is a side view of the input dispenser and recorder of the present invention used as a seed tender.
Figure 2:
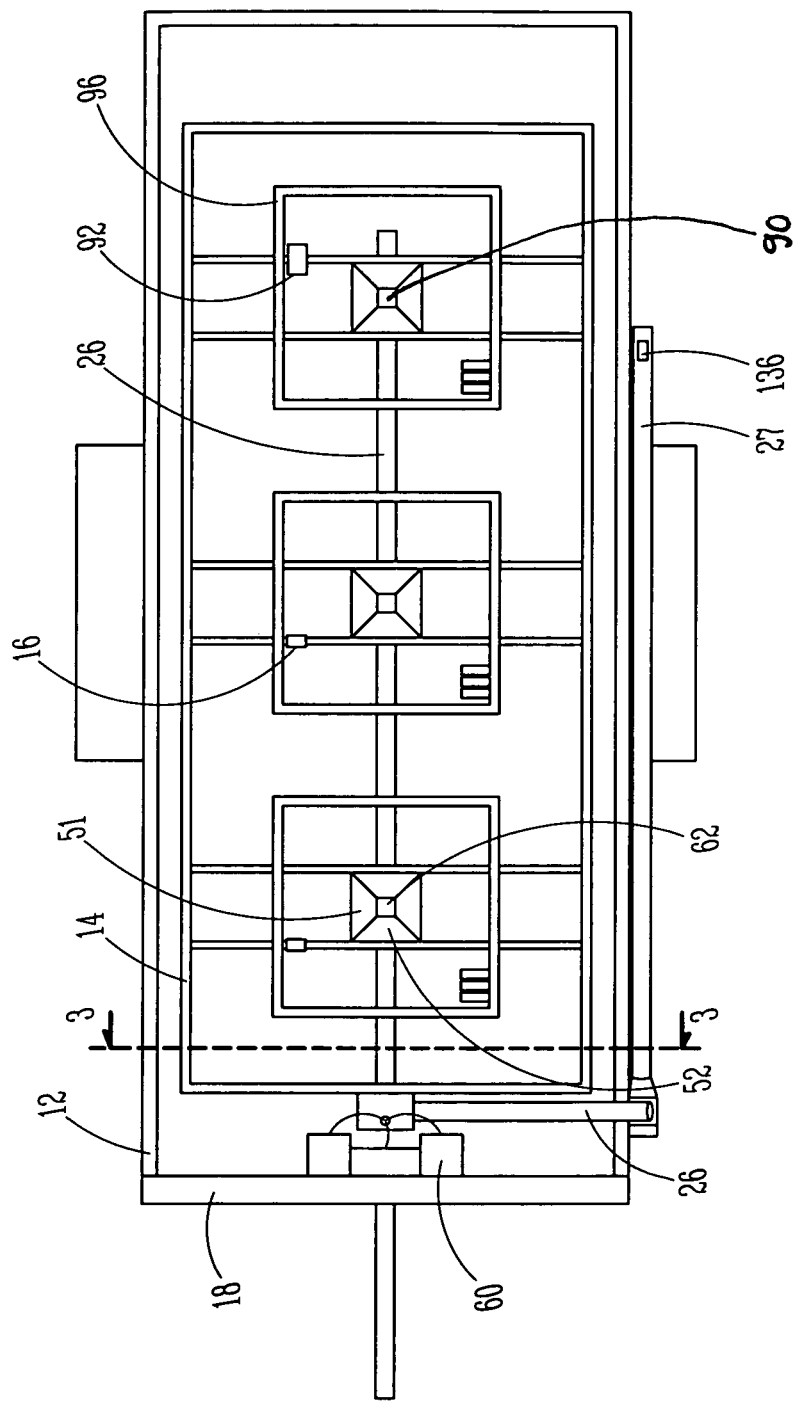
FIG. 2 is a plan view of the input dispenser and recorder of FIG. 1 without major input containers.

Specifically and with reference to FIGS. 1 and 2 the input dispenser and recorder 10 provides an arrangement that includes an outer frame 12 and an inner frame 14 moveably associated by a plurality of load bars 16. Said outer frame 12 of the preferred embodiment comprises an accessory bar 18 and, in the preferred embodiment, includes at least one hollow portion 20 used as an hydraulic fluid reservoir. The dispenser further comprises hitching means 22 and wheels 24 in order to allow for transportability. At least one major input container 50 having an opening 51 in fluid communication with first means to affect flow of input 62 and means to convey input 26 is associated with said inner frame 14. A tension-secured rail 200 pivotally attached to the outer frame locks said major input containers 50 in place.

Figure 3:
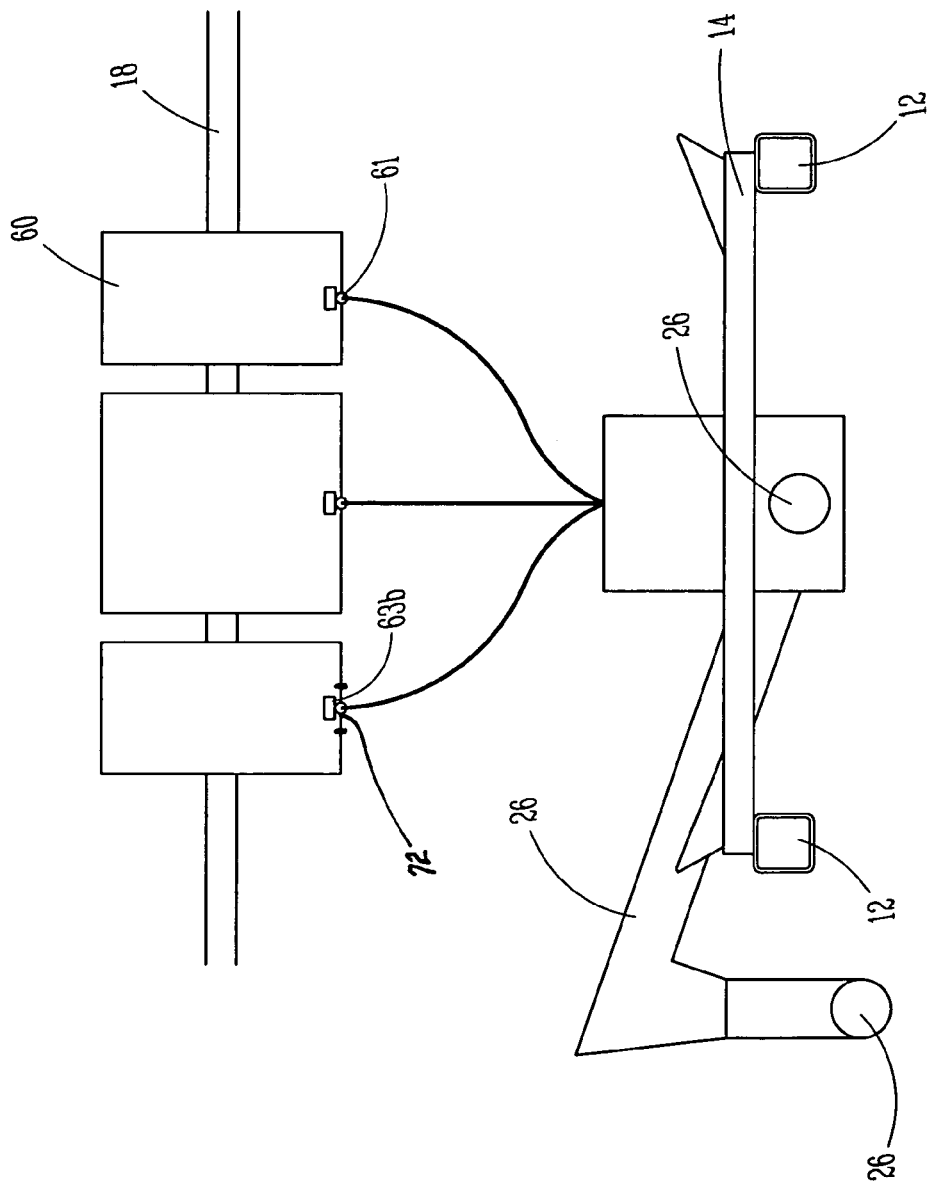
FIG. 3 is a perspective close up along line 3-3 in FIG. 2 showing the minor containers in fluid communication with means to convey.
Figure 4:
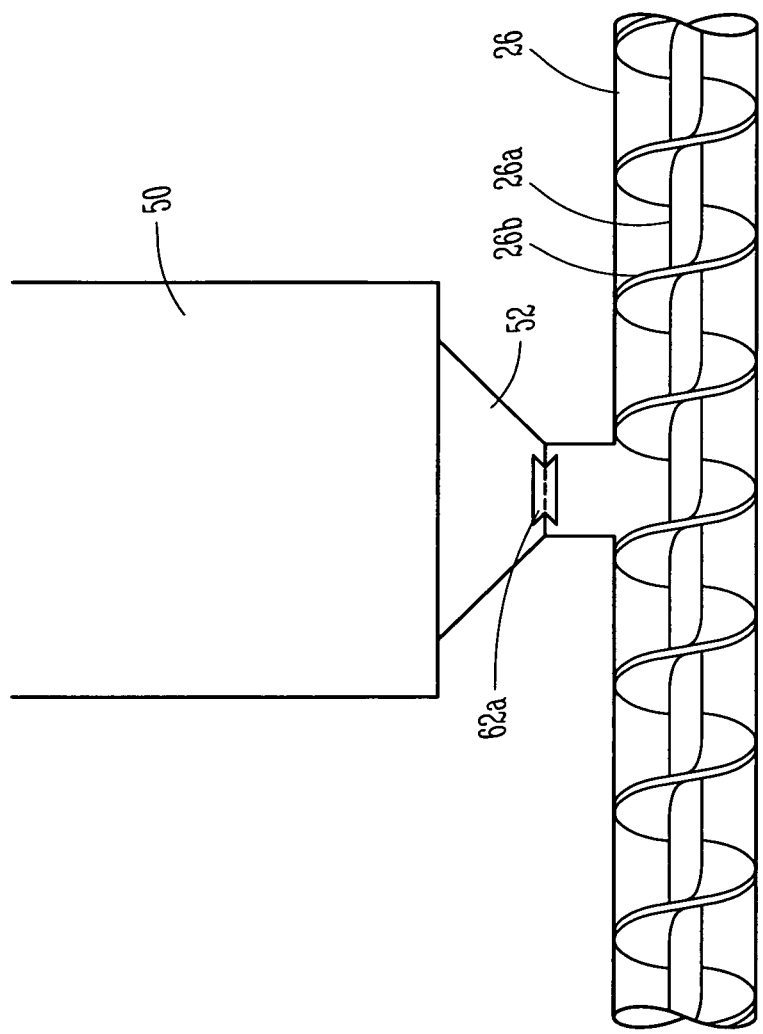
FIG. 4 is a cut away of a major container of FIG. 1 along line 4-4 of means to convey inputs and means to effect flow of an input of one embodiment of a preferred embodiment.
Figure 5:
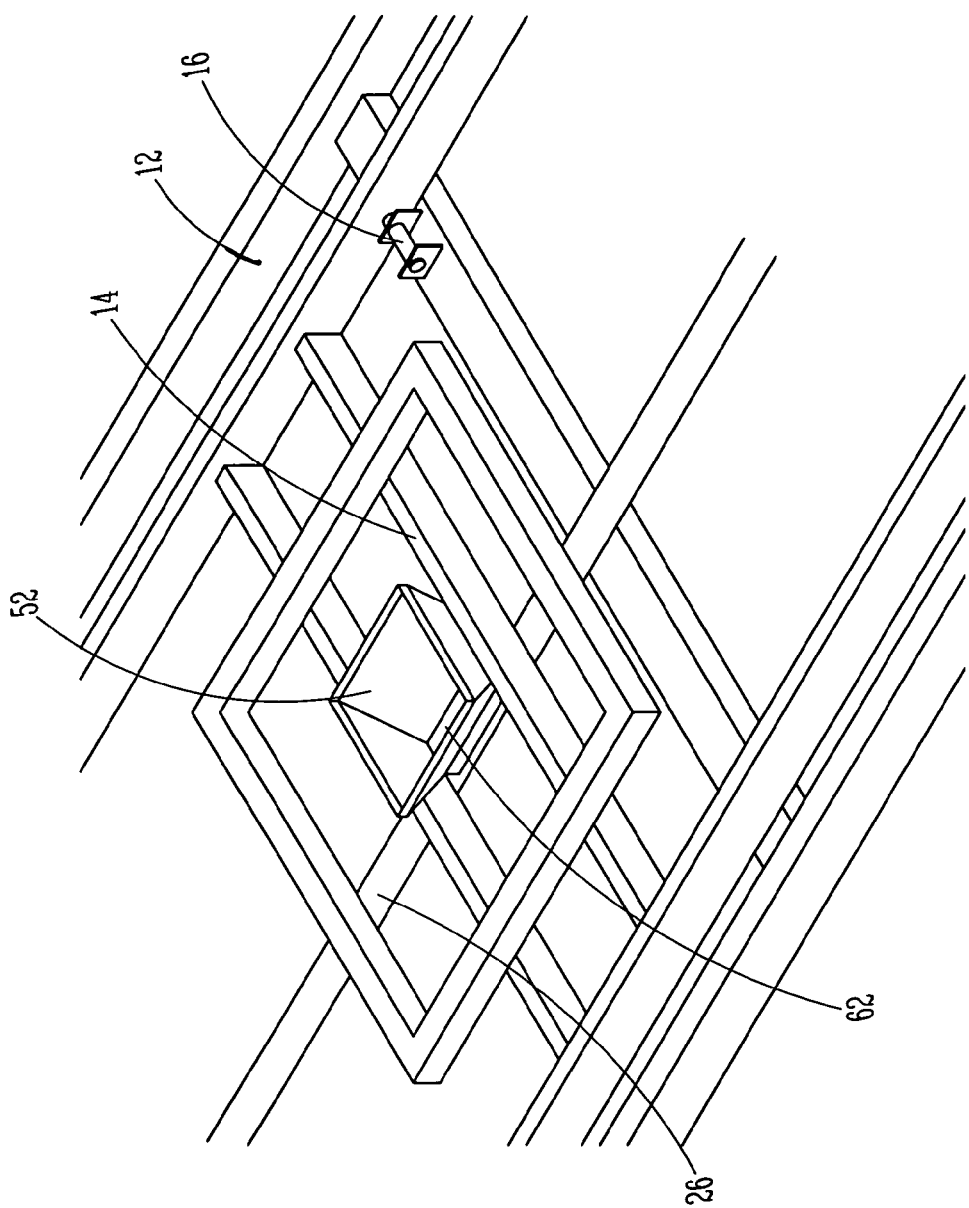
FIG. 5 is a close up perspective showing the inner and outer frames, and the hopper without a major container installed.
Figure 6:
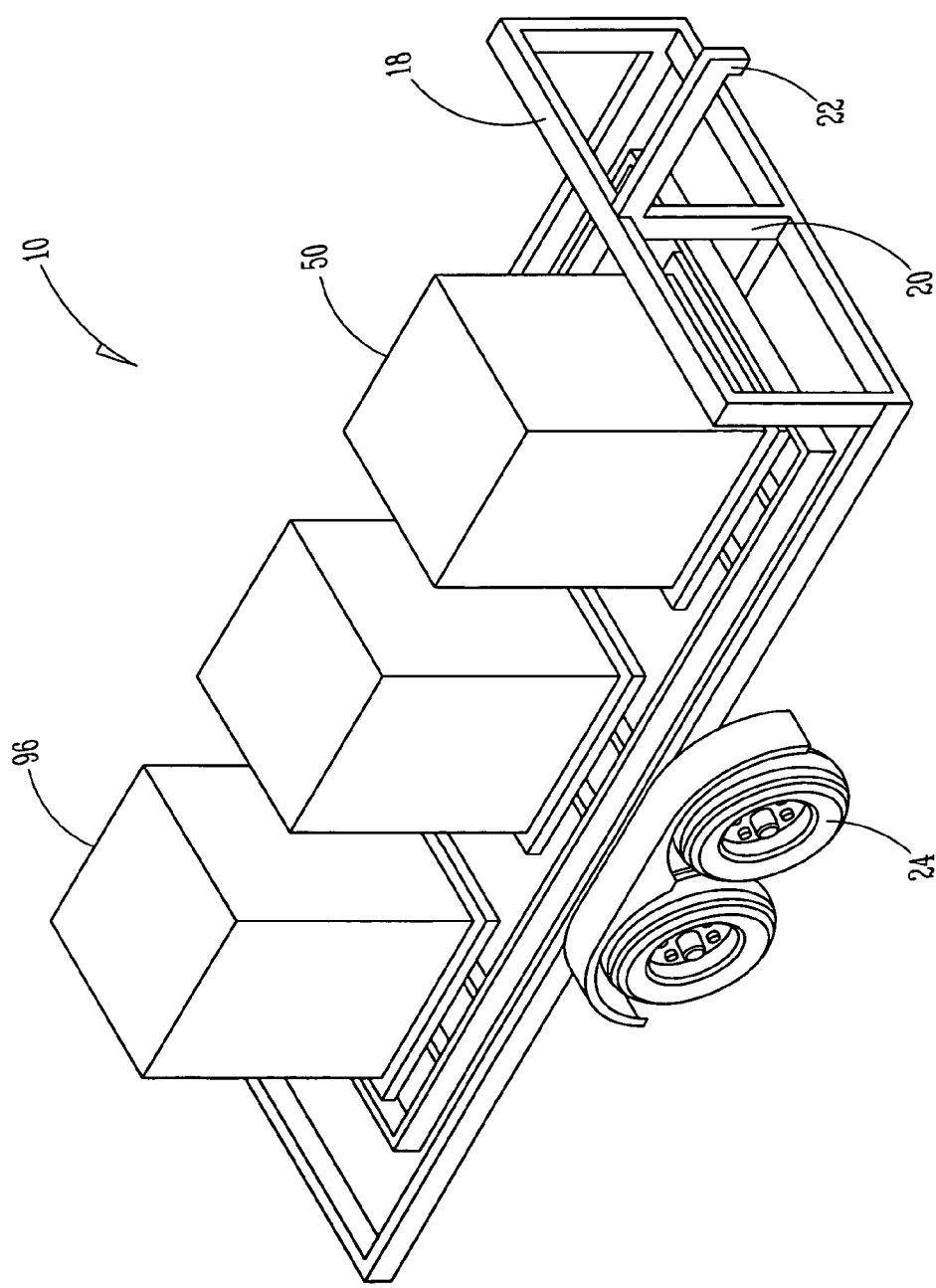
FIG. 6 is another perspective showing another angle of the invention shown in FIG. 1.

In a preferred embodiment, shown in FIG. 3, at least one minor input container 60 having an opening 61 in fluid communication with second means to affect flow 63 of input and means to convey 26 input is associated with said outer frame 12. (It should be noted that in certain embodiments to be described below, the relative size or volume of the minor containers to major containers are not relevant to the invention.) As shown in the schematic diagram of FIG. 14, a computer 30 and program 100 is interfaced with at least one electronic scale 32 associated with said plurality of load bars 16, said means to convey output 26, said first means to affect flow of input 62 and said second means to affect flow of input 63.

Figure 12:
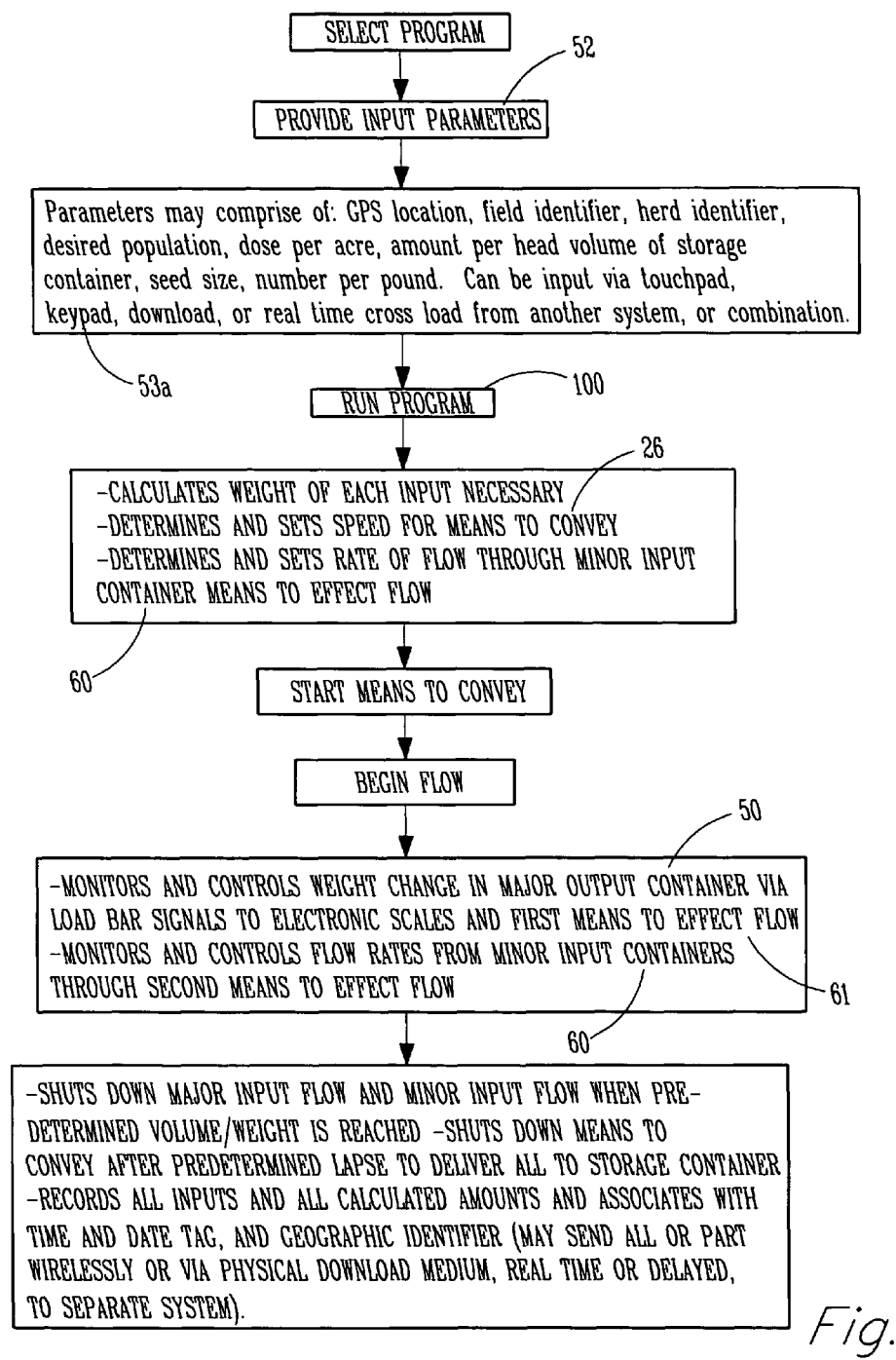
FIG. 12 shows a software program to effect appropriate mixing and dispensing for dry inputs.
Figure 13:
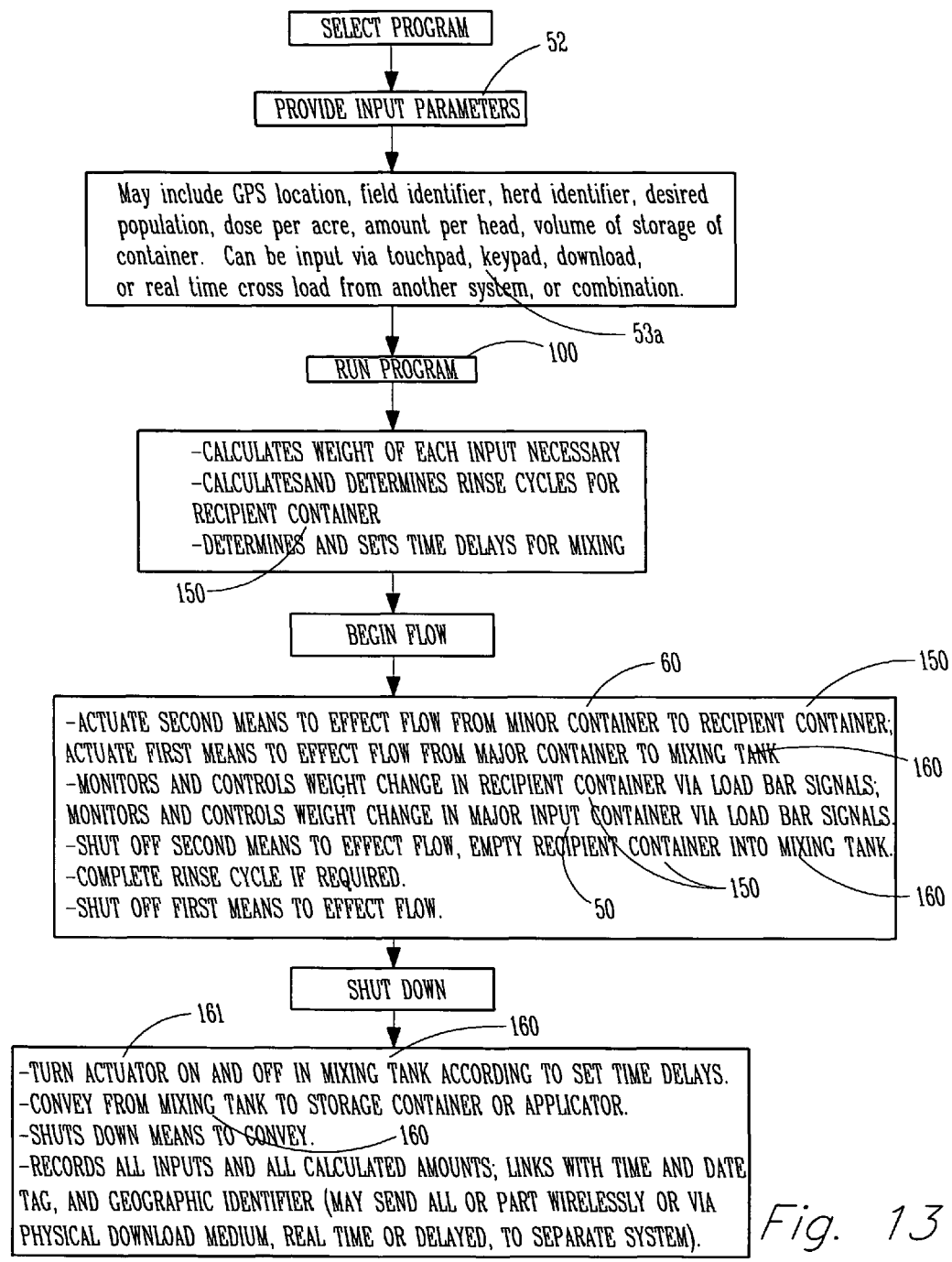
FIG. 13 shows a software program to effect appropriate mixing and dispensing for liquid inputs.
Figure 14:
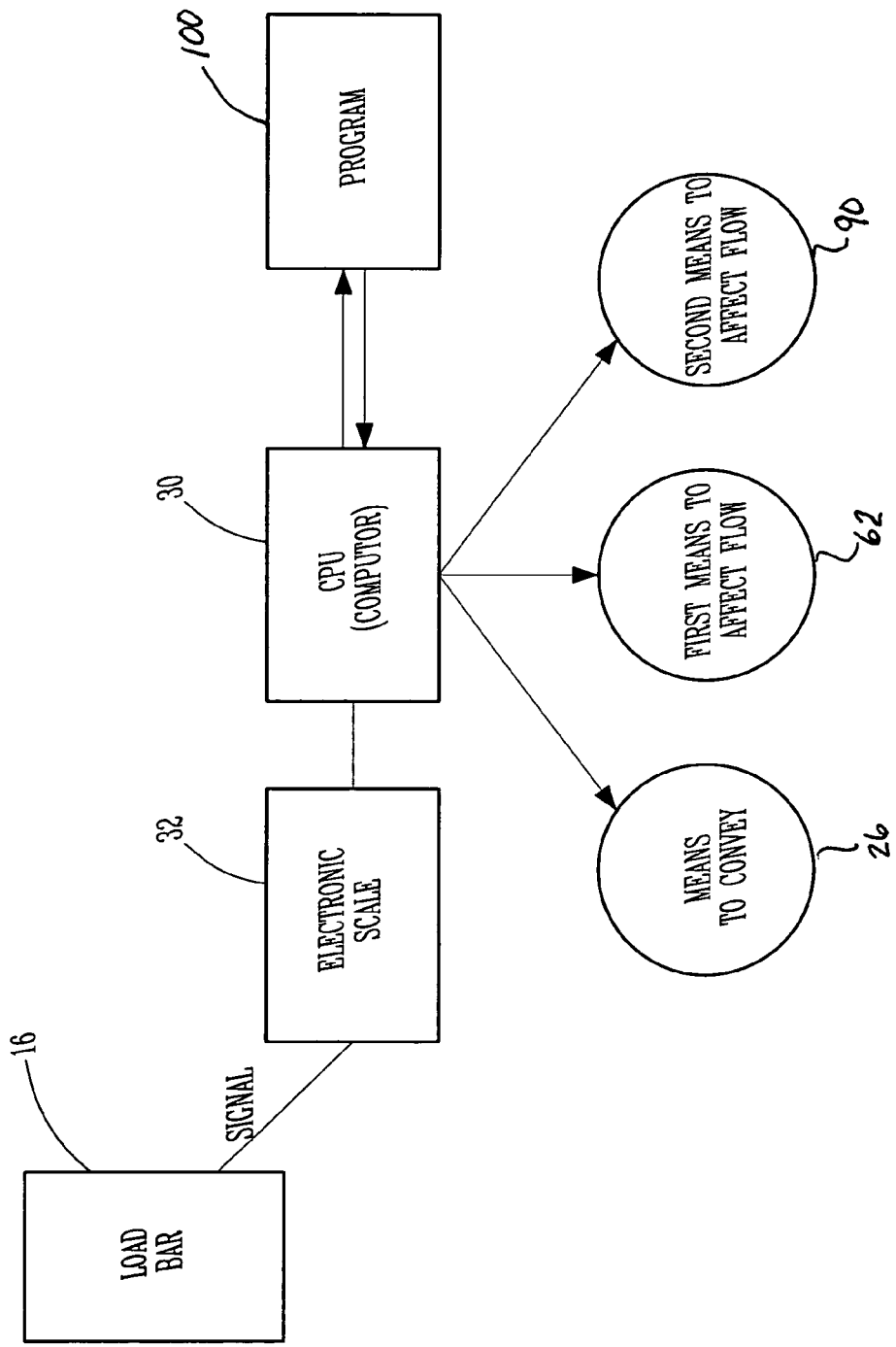
FIG. 14 shows the relationship between load bar and means to effect flow in the present invention.

Referring now to FIGS. 12-14, in use, the operator supplies at least one specific parameters 52 to the computer 30 by way of means to input data 53. Such means may comprise a key pad 53a, touch pad, data transfer media or hardware, or wireless communication from another source. The operator selects and activates a program 100 and supplies the requisite parameters 52. The program 100 then applies the parameters 52 and actuates means to convey input 26 to move inputs at a particular rate and to cause the required agitation and mixing. Said first 62 and said second 63 means to affect flow of input associated with an input container is separately controlled by said program 100 and coordinated with the rate of movement of input through said means to convey 26. By coordinating the flow and the means to convey 26, the program 100 creates the necessary physical action for the resulting mixture 40 required as well as the ratio of inputs one to another for the requisite final mixture 40. If desired, operation of means to affect flow of a minor input may be manually controlled while prompted and recorded by the CPU.

At the end of said means to convey 26, the mixed inputs are dispensed by a terminal conveyor 27 into a storage container (not shown) for use. For reasons to be described later, in an embodiment shown best in FIG. 7 where liquid inputs are employed, the inputs are dispensed one at a time first to a recipient container 150 and then into a mixing tank 160 where means to stir 161 are provided Said mixing tank 160 may be associated with either said inner frame 14 or said outer frame 12 or separate therefrom.

In an embodiment shown in FIG. 2 wherein a combination of dry and liquid inputs is used; it may be desirable to first dispense the mixed inputs from said means to convey 26 into a set tank 96 where means to vibrate 92 provide necessary agitation to provide more even application and better flowability upon final dispensing. The set tank 96 may be associated with either said inner frame 14 or said outer frame 12. The time for mixing or setting is monitored by the program 100, and when completed, said CPU 30 activates a third means to affect flow 90 so the mixture re-enters said means to convey 26 and is finally conveyed to the storage container 70.

The invention also contemplates a program 100 wherein the mixture 40 is dispensed to a plurality of receiving containers 70a of known volume (such as one planter box mounted above each row to be planted) rather than to a storage container 70. Here, the program 100 would provide for pre-programmed time delays such that after one of said plurality of receiving containers 70a is filled, a certain delay allows movement of the terminal conveyor 27 to the next container 70a and then automated dispensing of the appropriate weight or volume occurs and so on.

Means to convey inputs 26 may include any of a number of well-known conveyors for dry inputs. For example, belt conveyors, flighted augers, and brush augers may be used and each may provide certain advantages related to clean-out and speed. For dispensing seed, for example, inputs will be better mixed by flighted augers but clean out will be easier using belt conveyors. For liquid inputs, pumps, valves, and conduits will be the most commonly employed means to convey, however, it is not inconceivable that gravitationally advantageous placement of major and minor input containers could minimize the need for pumping liquids of low viscosity. Where inputs are both dry and liquid, the means to convey will be most dependent on the phase of the major inputs and may employ a combination of different means to convey in different parts of the input dispenser and recorder.

The embodiment shown in FIGS. 1-6 comprises an input dispenser/recorder used as an automated seed tender. The major input container 50 holds seed to be planted and sits on the inner frame 14. Input container 50 sits above a first opening into a hopper 52. A second opening is positioned at the bottom of the hopper 52. Means to affect flow 62 comprises a butterfly valve 62a. The butterfly valve 62a is in fluid communication with means to convey 26 and is controlled by the program 100 executed by the CPU 30. After parameters 52 are entered, the operator actuates the program 100; the program 100 records present weight 104 on the inner frame 14, turns on the means to convey 26, opens the butterfly valve 62a and begins to dispense the contents of the major input container 50. The program 100 monitors the change in weight 104 and determines when the appropriate amount of seed has been removed from the container 50. The means to convey 26 is allowed to run precisely as long as the program 100 has determined will be required to empty the means to convey 26 and the desired amount of seed is entirely dispensed into the storage container 70. If said means to convey 26 comprises an auger 26a having flighting 26b, a motor 136 associated with the auger 26a is equipped with a sensor 137 to sense a change in torque as it empties. The motor 136 lowers the auger flighting within the auger housing to move remaining seed out, and then returns the auger flighting 26b to its normal operating position when finished When used as a seed dispenser, the accessory bar 18 may have a plurality of minor input containers 60 mounted on it wherein each contains a particular seed treatment. As best seen in FIG. 3, each said container 60 comprises an orifice 72 with a flow meter 63b as second means to effect flow 63. Alternatively, other embodiments may employ a metering pump or other means to affect flow including a manual actuator. Said flow meter 63b is controlled by the CPU 30 and is in fluid communication with said means to convey 26. If the program 100 requires certain ratios of seed treatment to seed, the program 100 will actuate means to convey 26 and simultaneously control the butterfly valve 62a in the hopper 52 and each of said flow meters 63a in each of said containers 60 separately in order to affect the appropriate ratios. Specifically the rate of flow of each seed treatment will be separately dictated relative to the flow of the other seed treatments and to the rate at which seed is conveyed. In addition, the speed of said means to convey 26 may be varied to facilitate appropriate mixing. In the seed tender embodiment, a series of connected flight augers 26a is used as the means to convey 26 seed and seed treatments.

If dry and liquid inputs are used together, the set tank 96 receives the treated seed Upon entry of the first treated seeds, means to vibrate 92 the set tank 96 is activated by the CPU 30 and continues until the pre-programmed time has elapsed At that time, the computer 30 may convey the set seed through additional means to convey 26 to a storage container 70 or it may wait for further operator input.

Figure 7:
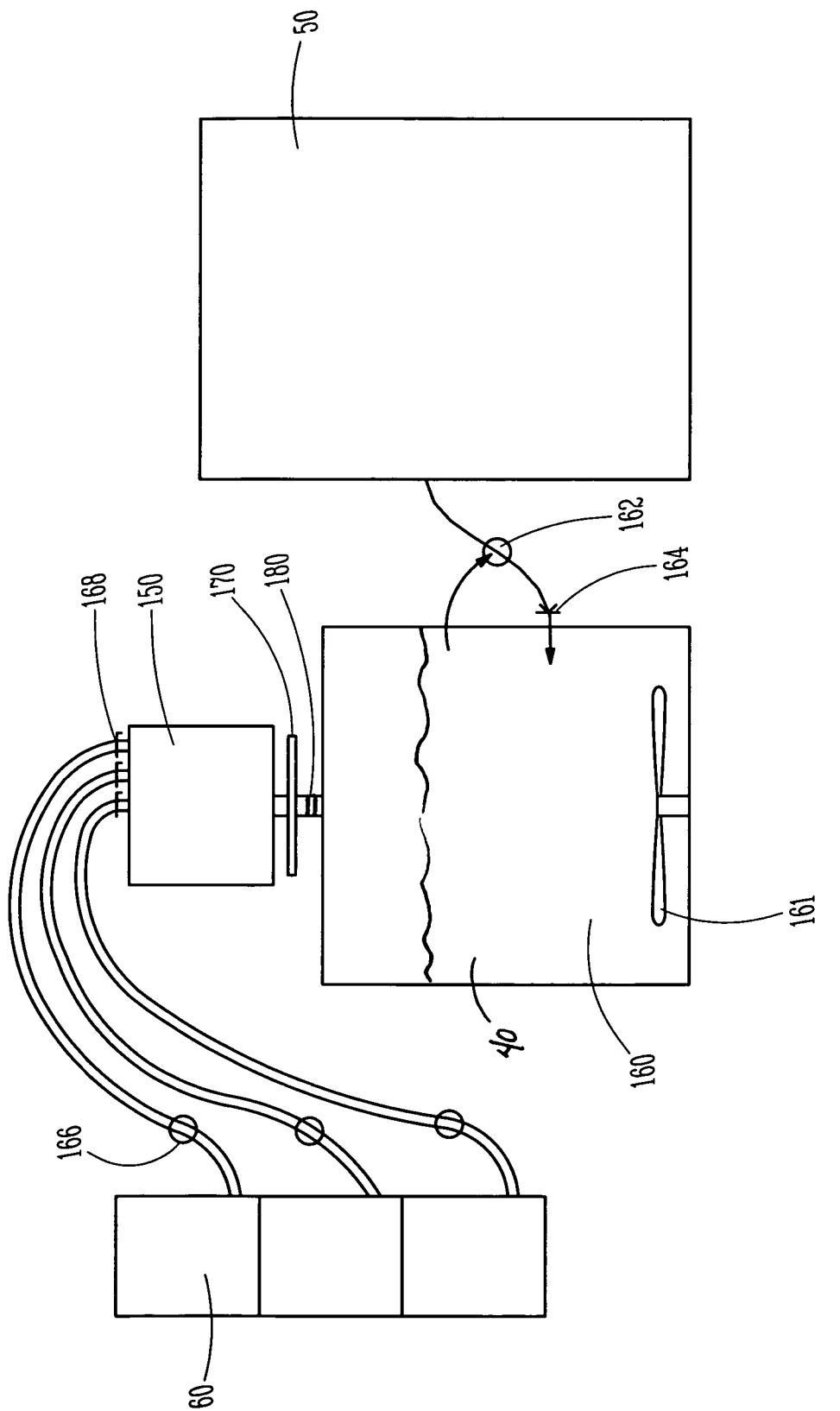
FIG. 7 is a side view of means to convey minor inputs to a receiving container of a second embodiment of the present invention.
Figure 8:
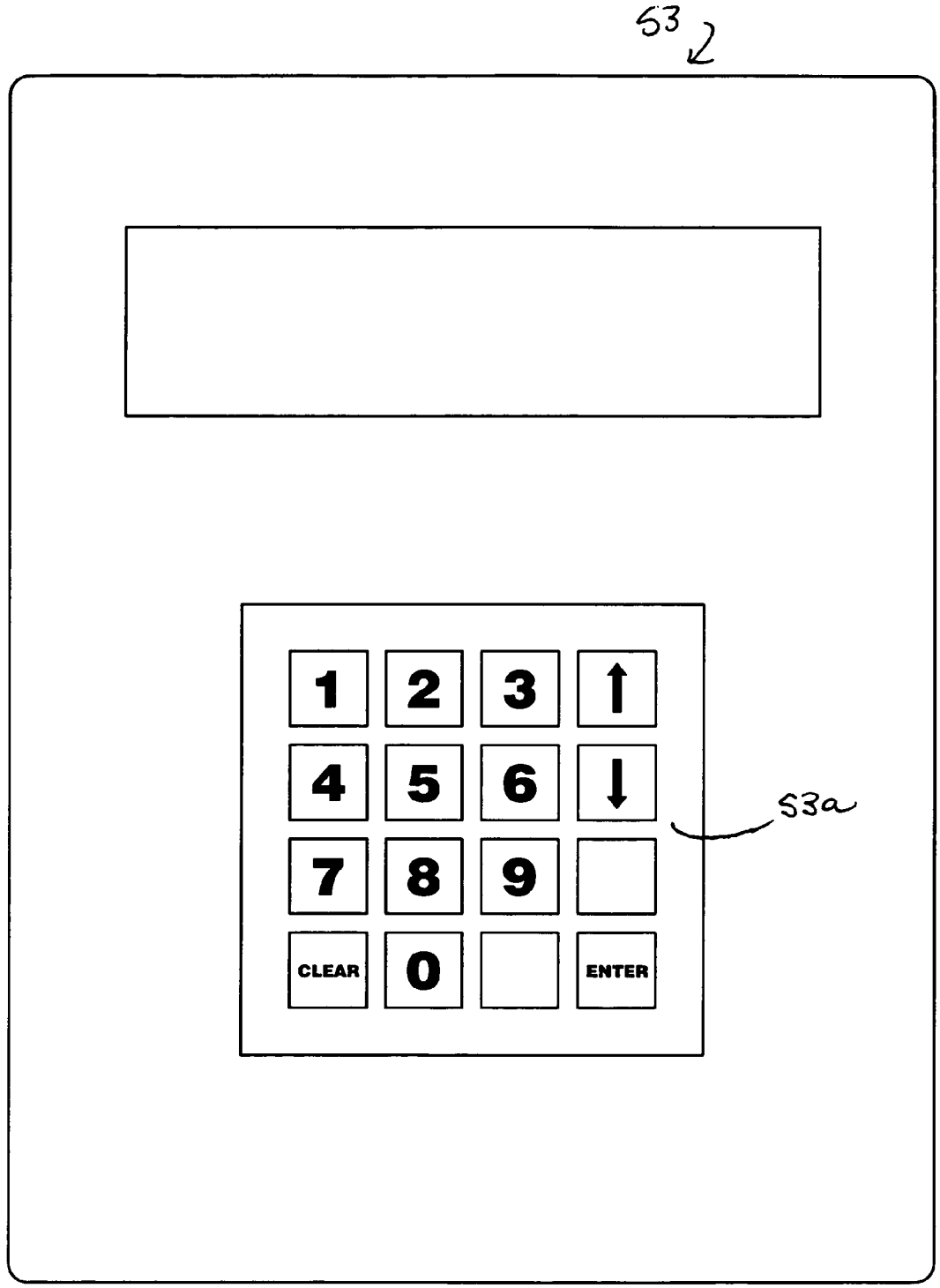
FIG. 8 is a close up view of the means to input data into the input dispenser and recorder.
Figure 9:
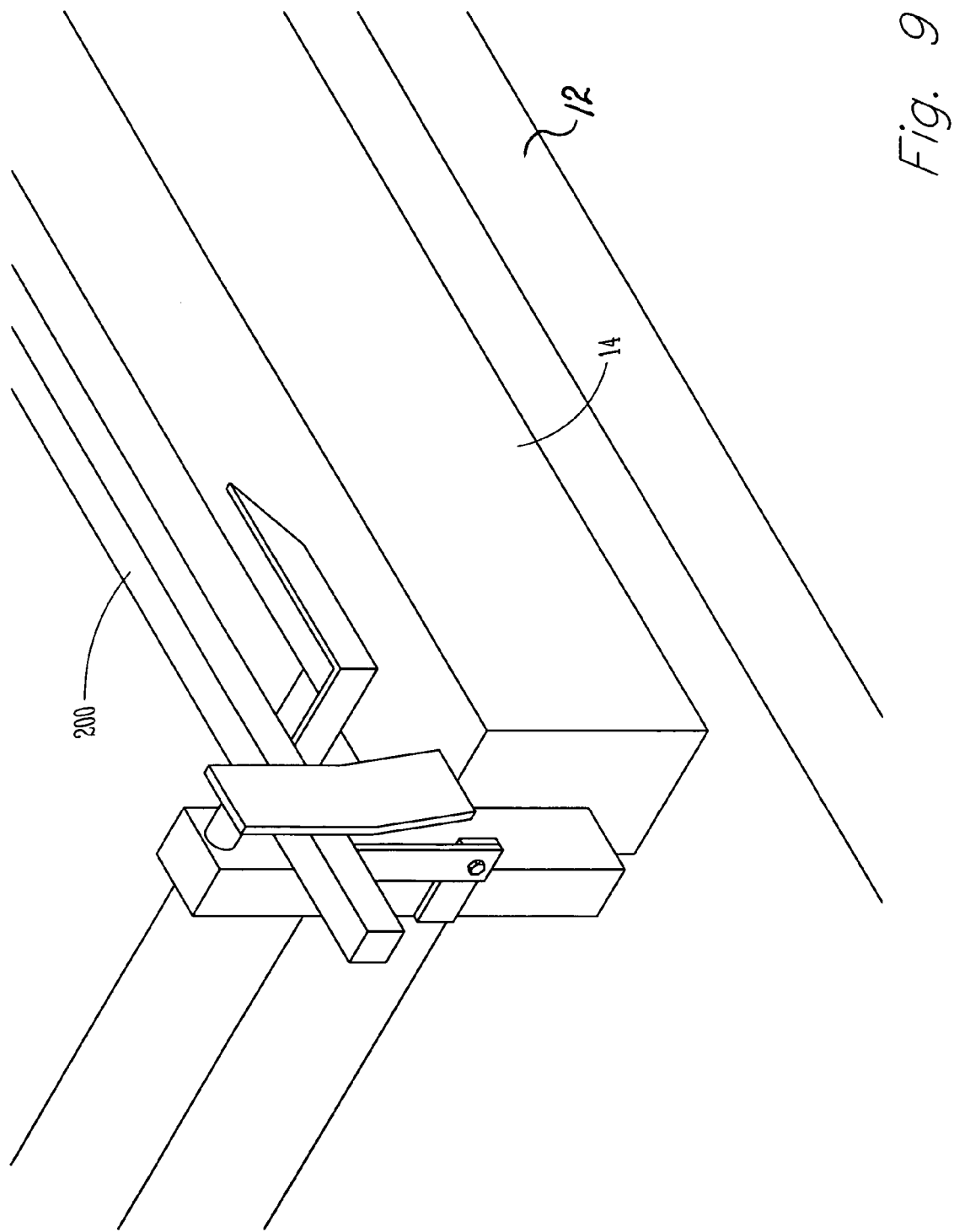
FIG. 9 is a perspective of FIG. 1 showing the tension-secured rail in closed position.
Figure 10:
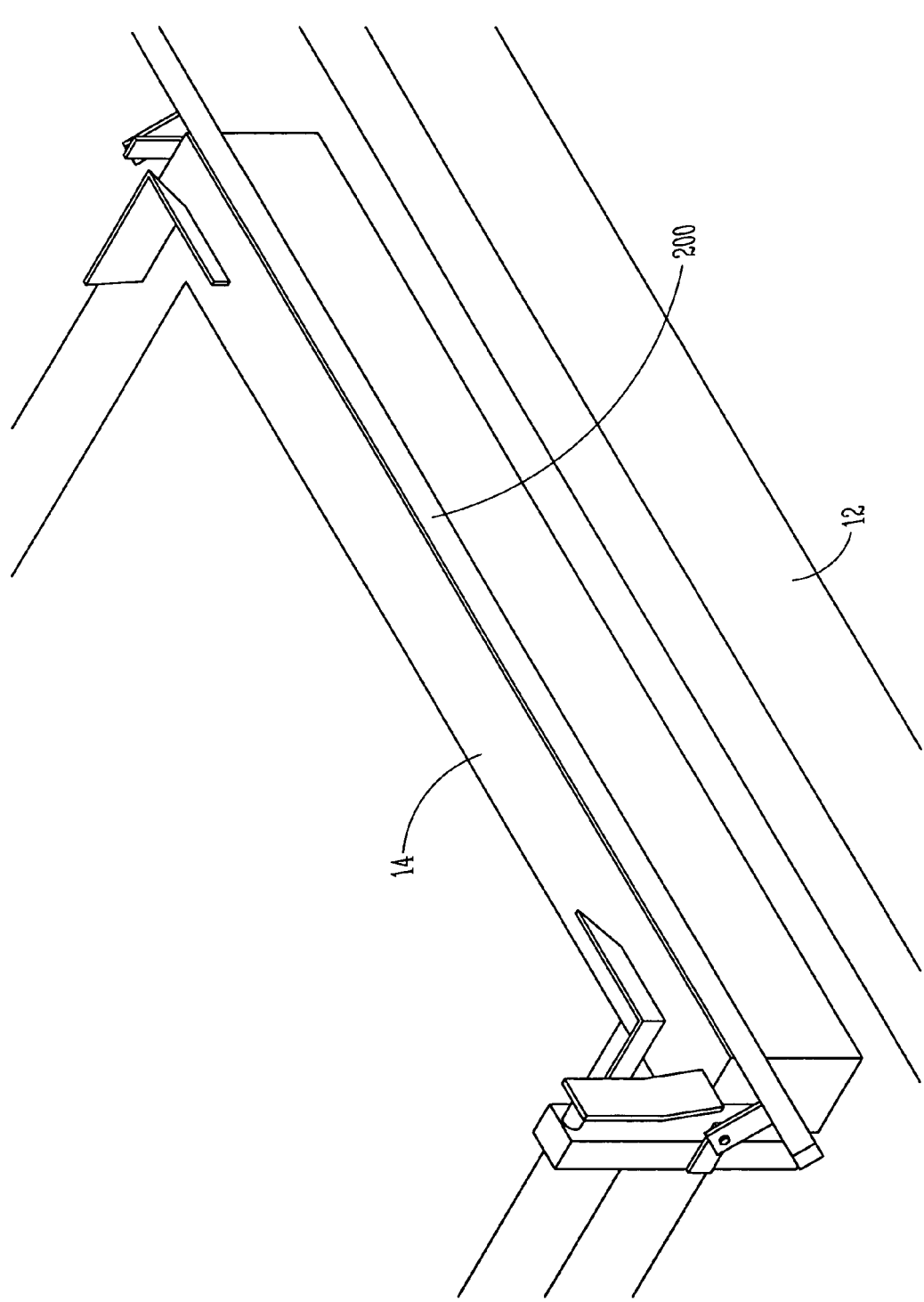
FIG. 10 is a perspective of FIG. 1 showing the tension-secured rail in open position.
Figure 11:
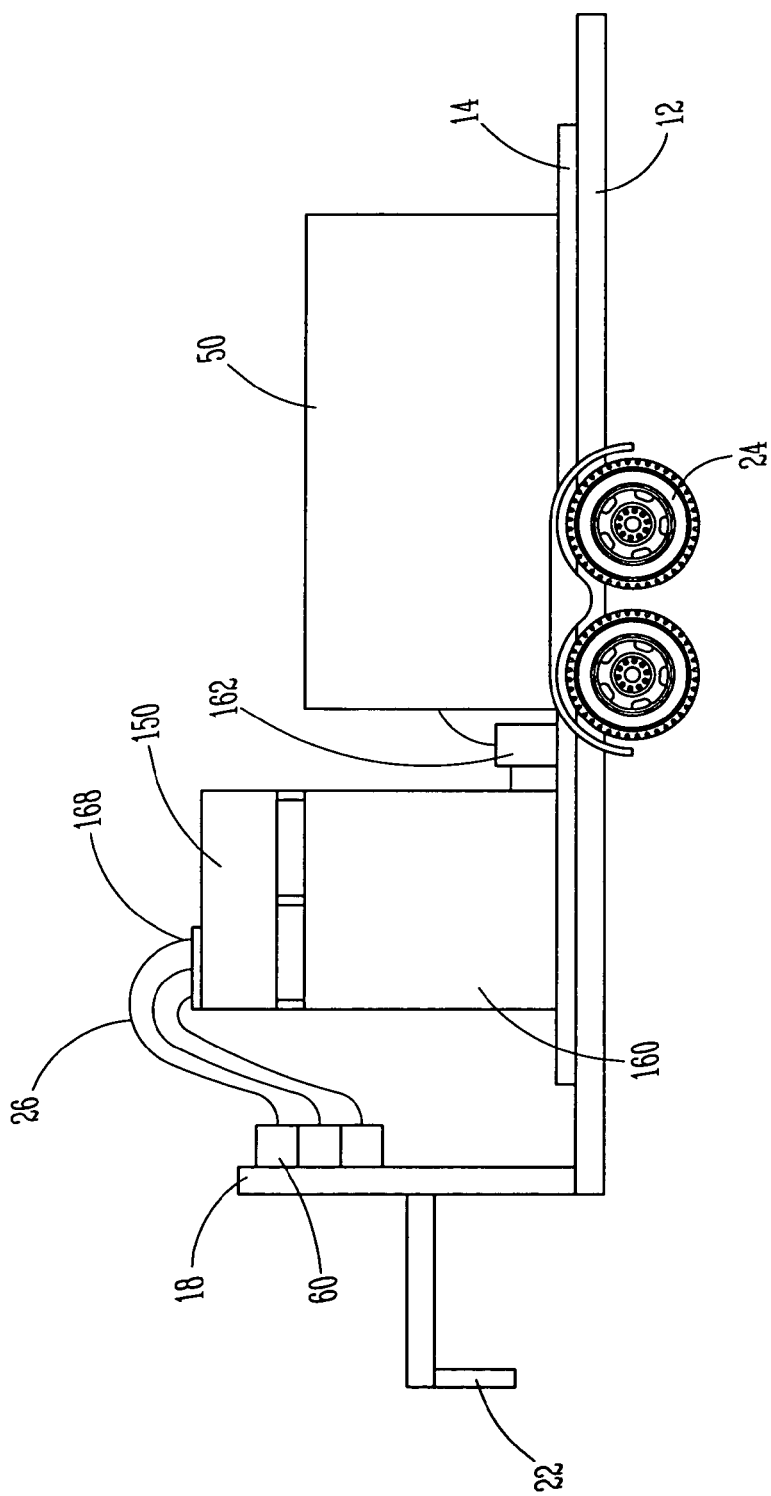
FIG. 11 shows a side view of an embodiment of the present invention used for liquids.

The terminal conveyor 27 is the final conduit through which the mixture 40 passes. In the seed tender embodiment, the position of terminal conveyor 27 can be controlled by the computer 30 through electric solenoid valves 95 and hydraulic cylinders such that it can be folded nearly parallel with the outer frame 12 for transportation, but unfolded to a desired position for dispensing mixed inputs. This feature provides a higher level of safety for the operator and during transport in addition to adding to the efficiency of the operative steps.

Where the resulting mixture 40 is in a liquid phase as shown in FIG. 7, the dispenser 10 further comprises a recipient container 150. The storage container 70 may be replaced by a mixing tank 160. Once again, the flow of inputs and relative amounts thereof are controlled by the CPU 30 as it applies the selected program. The recipient container 150 is associated with an electronic scale 170. In this embodiment, the major container 50 typically holds a diluent. Means to convey 26 fluidly associates the major container 50 and the mixing tank 160 through a pump 162 and valve 164. In one modification, the mixing tank 160 and major container 50 are connected via a circulating pump. The addition of diluent may be monitored by a flow meter, rather than by weight. Mixing the inputs may be effected by recirculation through the circulating pump 162 or an agitator 161.

In the preferred embodiment for liquid applications, said second means to affect flow comprises a valve and means to convey comprises a conduit and a pump. Each of the other fluid inputs are held in a separate minor container 60 wherein said minor container 60 is fluidly connected to said recipient container 150 by means to convey 26 and a pump 166 and valve 168 comprises said second means to affect flow. Here, each input is separately dispensed into the recipient tank 150 by the computer 30 until the requisite weight required by the program 100 is detected. Then, the computer 30 activates a dumping mechanism 180 and the input in one recipient tank 150 empties into said mixing tank 160. These steps are repeated for each input. The specific amounts and order of addition of each input and the diluent is dictated by the program 100.

The preferred embodiment includes a pump 162, a circulating pump whereby the recipient tank 150 may be rinsed by a small amount of diluent from said major input container 50 each time after the recipient tank 150 is emptied into said mixing tank 160. Further, said mixing tank 160 includes said agitator 161 actuated by the computer 30 according to predetermined time delays dictated by the program 100.

In another modification, the CPU 30 applies the program 100 and tells the operator which of the minor inputs needs to be added manually, when to add it, and how much to add. Here, the addition may be to the mixing tank or to the recipient container. This modification is especially useful for the situation where the amount of a minor input is small enough that its addition by weight may not be accurate based on the level of error of the scale employed. Once a minor input is added, the operator provides input to the computer to confirm its addition.

In yet a further modification, the dispenser and recorder is permanently located and comprises a recipient tank, a computer and program and having means to receive data and to send data, a major input container with means to convey said major input to said recipient tank wherein said means to convey is controlled by said computer, and an electronic scales associated with the recipient tank and with the computer. This modified version can be used such that the recipient tank is a re-usable chemical container and to operate as a dispensing station for chemicals. In the preferred version, each reusable chemical container has an electronic identifier whereby upon filling the re-usable container to the amount dictated by the program, the identifier, contents, and amount is recorded and sent to an inventory management system.

After the liquid mixture is adequately mixed, it will be conveyed to an applicator through a flow meter. A record of the mixture, conditions, time and date, location, and volume will be made and transferred as necessary to other systems as described herein.

When applying herbicides and pesticides certain conditions dictate alterations in the basic mixture ratios. For example, dry hot conditions will dictate more chemicals to be sprayed per acre. Early morning or evening application typically requires higher concentration of chemicals because the plants are not as active and will not uptake the chemicals at the same rate as they would later in the day. If weeds are at a four inch height the required amount of herbicide will differ from that required if weeds are six inch height. Further, a drift retardant can be added in applications to be sprayed. The amount of drift retardant required depends on the wind speed. There are wind speeds at which a drift retardant will not suffice and the mixture should not be applied. The program used by the CPU may be written to require input of conditions and then apply an algorithm to produce the mixture best suited to the conditions. The conditions can be supplied manually or via electronic means including local placement of detectors on the dispenser/recorder or downloading information from any of a variety of local atmospheric monitoring services. The program can even be written to warn an operator that conditions are suboptimal for application at all.

Each of the embodiments described above includes the ability to receive data in the form of work orders and then apply that data to the selected program to complete the order.

What we claim is:

1. A computer-aided batch input dispenser for agricultural applications comprising:
    a) at least one major input container comprising an opening in fluid communication with a first means to affect flow of at least one major input;
    b) at least one minor input container comprising an opening in fluid communication with a second means to affect flow of at least one minor input;
    c) means to convey said at least one major input from said at least one major input container and said at least one minor input from said at least one minor input container; and
    d) a computer comprising a means to receive data corresponding to at least one current condition, wherein said at least one current condition includes a weather condition or a growing condition occurring at or near a time of application; and
    e) wherein said computer executes a program that applies a formula to determine an appropriate mix of inputs for application based on at least one of said at least one current condition and optionally controls at least one of the first means to affect flow of at least one major input, the second means to affect flow of the at least one minor input, and the means to convey the at least one major input from said at least one major input container and the at least one minor input from the at least one minor input container, based on the at least one current condition.

2. The dispenser claimed in claim 1 wherein said at least one major input container is associated with an electronic scale and said electronic scale is associated with said computer, said computer directs said first means to affect flow to allow said major input to exit said major input container into said means to convey until a change in weight indicated by said electronic scale matches that required by the program's application of said formula.

3. The dispenser claimed in claim 2 wherein said means to convey provides fluid communication between said at least one major input container and said at least one minor input container.

4. The dispenser claimed in claim 3 wherein said means to convey comprises at least one plurality of rollers around which at least one belt is rotated.

5. The dispenser claimed in claim 2 wherein said means to convey comprises a series of flighted augers and at least one auger tube.

6. The dispenser claimed in claim 2 wherein said means to convey comprises a plurality of conduits and an air flow and pressure source.

7. The dispenser claimed in claim 1 wherein said first means to affect flow comprise a butterfly valve and said second means to affect flow comprise a flow meter.

8. The dispenser claimed in claim 7 wherein said computer adjusts said flow meter and said butterfly valve relative to said means to convey, wherein a conveyance rate of said means to convey can be varied, such that said at least one major input and said at least one minor input are present in a mixture according to the program's application of the formula.

9. The dispenser claimed in claim 1 wherein said dispenser further comprises a recipient container associated with an electronic scale and said computer, a mixing tank, and said means to convey comprises a plurality of conduits and at least one pump.

10. The dispenser claimed in claim 1 further comprising a mixing tank associated with means to mix wherein said means to convey comprise a plurality of conduits and at least one pump and said first means to affect flow comprises at least one valve and said second means to affect flow comprises at least a second valve whereby said at least one major input and said at least one minor input are conveyed substantially separately to said mixing tank and mixed therein.

11. The dispenser claimed in claim 10 further comprising a recipient tank associated with an electronic scale and having means to generally empty into said mixing tank and said electronic scale associated with said computer wherein said computer actuates said at least one pump and said at least one valve to convey a single minor input from said minor input container to said receiving tank until the electronic scale indicates substantially an amount required by the application of said formula by said computer, actuates said means to generally empty said recipient tank into said mixing tank, and actuates said means to mix.

12. The dispenser claimed in claim 11 wherein said computer actuates another of said at least one pump and another of said at least one valve to convey another minor input and weigh and generally empty said input into said mixing tank until each minor input required has been conveyed, weighed substantially according to the application of said formula, and emptied into said mixing tank.

13. The dispenser claimed in claim 12 wherein said computer actuates said first means to affect flow causing said major input to flow from said major input container into said mixing tank, monitors said flow until an amount generally equal to that dictated by the application of said formula is reached, and turns off said first means to affect flow.

14. The dispenser of claim 11 wherein said data comprises information regarding at least one of a plurality of current conditions and said program includes an algorithm applied to alter said formula relative to said at least one of said plurality of current conditions.

15. The dispenser of claim 11 wherein said computer applies said program to prompt an operator to add a specific amount of an input and requires operator confirmation of said addition prior to providing a prompt for another input.

16. The dispenser of claim 15 wherein actual weight of each input is recorded.

17. The dispenser claimed in claim 1 further comprising a recipient tank associated with an electronic scale and fluidly connected to said means to convey wherein said means to convey comprises a plurality of conduits, a separate pump associated with each of said minor input containers, and a separate pump associated with each of said major input containers; said first means to affect flow comprise a valve and said second means to affect flow comprise a second valve; said computer adjusts said valve and said separate pump associated with said major input container and adjusts each said second valve and each said separate pump associated with each said minor input container whereby each said at least one minor input is conveyed separate from any other said minor input to said recipient tank where it is weighed and then emptied to a mixing container, and said at least one major input is conveyed to said mixing container all according to the program's application of the formula.

18. The dispenser claimed in claim 1 further comprising a set tank associated with means for vibrating and one of said at least one minor input comprises a liquid wherein said first means to affect flow comprise a butterfly valve and said second means to affect flow comprise a flow meter and said computer adjusts said flow meter and said butterfly valve relative to said means to convey such that said at least one major input and said at least one minor input are conveyed to said set tank whereby said means for vibrating agitate until said liquid minor input.

19. The dispenser claimed in claim 1 wherein said means to receive data comprise wireless data transfer.

20. The dispenser claimed in claim 1, said computer further comprising means to input data, wherein said means to input data comprise a touchpad.

21. The dispenser of claim 1 wherein said data includes information regarding at least one current condition selected from the group consisting of: wind speed, temperature, time of day, weed height, precipitation, cloud cover, and infestation levels.

22. The dispenser of claim 1 wherein said data comprises information regarding at least one of a plurality of current conditions and said program includes an algorithm applied to alter said formula relative to said at least one of said plurality of current conditions.

23. The dispenser of claim 1 wherein data comprises information about at least one of a plurality of current conditions, said program includes an algorithm applied to alter said formula relative to said at least one of a plurality of current conditions, and said computer prompts an operator to add each input in a specified order and amount.

24. A computer-aided batch input dispenser for agricultural applications comprising:
   a) an inner frame and an outer frame, wherein the inner frame is moveably associated with the outer frame by a plurality of load bars, and wherein an electronic scale is associated with the plurality of load bars;
   b) means to convey input;
   c) hitching means and means to transport said dispenser overground;
   d) at least one major input container associated with said inner frame, said at least one major input container comprising an opening in fluid communication with a first means to affect flow of input and with said means to convey input;

e) at least one minor input container comprising an opening in fluid communication with a second means to affect flow of input and with said means to convey input;

f) a computer comprising means to input data, means to receive data, and interfaced with said electronic scale associated with said plurality of load bars;

g) a program associated with said computer, said program capable of receiving data from said means to input data, the data including at least one current condition, applying a formula to said data to determine a requisite amount of at least one major input and said at least one minor input for creating a mixture based on the current condition.

25. The dispenser claimed in claim 24 further comprising a set tank in fluid communication with said means to convey and having means to vibrate controlled by said computer whereby said at least one major input and said at least one minor input are delivered to said set tank and said program includes at least one pre-determined time delay whereby means for vibrating in said set tank are activated and deactivated automatically to facilitate flowability to said mixture.

26. The dispenser claimed in claim 24 further comprising an accessory bar associated with said outer frame wherein said at least one minor input container is mounted on said accessory bar.

27. The dispenser claimed in claim 24 wherein said first means to affect flow comprise a butterfly valve and said second means to affect flow comprise a flow meter and said means to convey input comprises a plurality of flighted augers and at least one auger tube.

28. The dispenser claimed in claim 24 wherein said means to convey comprise a plurality of conduits and at least one pump, and said first means to affect flow comprise a valve.

29. The dispenser claimed in claim 24 wherein said means to convey comprise a plurality of flighted augers, at least one auger tube, and a terminal conveyor controlled by at least one solenoid valve and a hydraulic cylinder to allow movement of said dispensing auger relative to said outer frame.

30. The dispenser claimed in claim 29 wherein said terminal conveyor is enclosed in one of said auger tubes and comprises means to lower said auger in said tube to effectively clean out said tube.

31. The dispenser of claim 24 further comprising a plurality of receiving containers of known capacity and said program provides for pre-programmed time delays between delivery of a weight of the mixture substantially equal or less than the capacity of each said receiving container.

32. The dispenser of claim 31 wherein each said receiving container comprises a remotely receivable identifier.

33. The dispenser of claim 31 wherein said formula further comprises determining and directing the mixture to the appropriate receiving containers.

34. The dispenser of claim 33 wherein said program applies more than one said formula to create more than one said mixture wherein each said formula further comprises determining and directing its mixture to the appropriate receiving containers.

35. The dispenser of claim 24 wherein said program records said data, amount used of each said input, a time stamp, a date stamp, and a geographic identifier.

36. The dispenser of claim 35 wherein said program conveys all recorded said data to a remote system.

37. The dispenser of claim 1 or 24 wherein said program sends said data, amount used of each said input, a time stamp, a date stamp, and a geographic identifier to an inventory management system.

38. The dispenser of claim 1 or 24 wherein said program associates a time stamp, a date stamp and a geographic identifier with the amount of each minor input and each major output used in said mixture and facilitates maintenance in real time of inventory of each minor input and each major input.

39. A computer-aided batch input dispenser for agricultural applications comprising:

a) at least one major input container associated with a conduit, at least one pump, and at least one valve for controlling a flow of at least one major input into a means for conveying said at least one major input;

b) a computer for executing a program, wherein said program uses a formula to determine a required amount of said at least one major input;

c) means to receive data corresponding to current conditions, which are weather conditions or growing conditions occurring at or near the time of application, and means to record said data, wherein said computer employs said data, said formula and said program to determine an appropriate mix of inputs for application based on the formula; and d) at least one recipient tank associated with an electronic scale and said electronic scale associated with said computer wherein said computer actuates said at least one pump and said at least one valve to convey said at least one major input from said at least one major input container to said receiving tank until the electronic scale indicates substantially an amount required based on said formula.

40. The dispenser of claim 39 wherein each said at least one recipient tank comprises a remotely receivable identifier and said formula comprises a work order and means to receive data receives said work order.

41. The dispenser of claim 40 wherein said dispenser records the amount of and work order relating to said input in said recipient tank and further comprises means to send recorded amount and work order to at least one remote system.

42. The dispenser of claim 39 wherein said dispenser and recorder records the amount of and work order relating to said input, each said at least one recipient tank comprises a reusable container for chemicals and comprises a remotely receivable identifier, said formula comprises a work order, and means to receive data receives said work order and said identifier.

43. The dispenser of claim 42 further comprising means to send recorded amount, work order, and identifier to at least one remote system.

44. A computer-aided batch input for agricultural applications comprising:

a) an inner frame and an outer frame, wherein the inner frame is moveably associated with the outer frame by a plurality of load bars;

b) means to convey input;

c) variable speed adjuster for said means to convey input;

d) hitching means and means to transport said dispenser overground;

e) at least one major input container associated with said inner frame, said at least one major input container comprising an opening in fluid communication with a first means to affect flow of input and with said means to convey input;

f) at least one minor input container comprising an opening in fluid communication with a second means to affect flow of input and with said means to convey input;

g) a computer comprising means to input data, and means to receive data, said data comprising at least one current condition, said computer interfaced with at least one electronic scale associated with said plurality of load bars, said variable speed adjuster for means to convey input, said first means to affect flow and said second means to affect flow of input; and h) a program associated with said computer, said program capable of receiving data from said means to input data, applying a formula to said data comprising determining a requisite amount of at least one major input and at least one minor input and determining and directing said variable speed adjuster on said means to convey, said first means to affect flow, and said second means to affect flow for creating a mixture in proportions according to said formula, wherein said formula uses the current condition to determine the proportions.

\* \* \* \* \*